July 30, 1957    J. S. PILCH    2,801,013
HYDRAULIC TRENCHER
Filed May 6, 1955    6 Sheets-Sheet 2

INVENTOR.
JOHN S. PILCH
BY
Raymond A. Paquin
ATTORNEY.

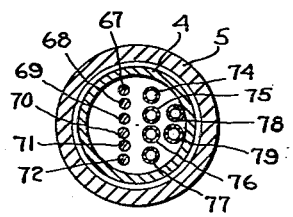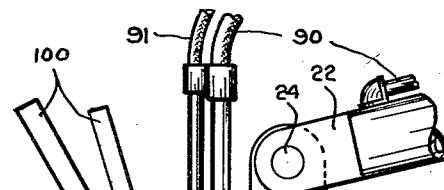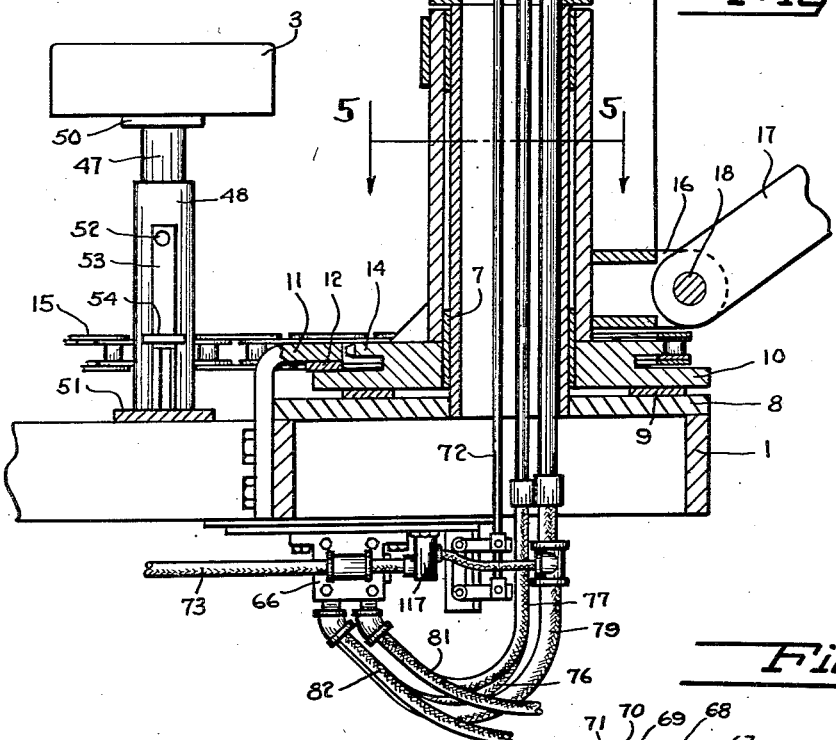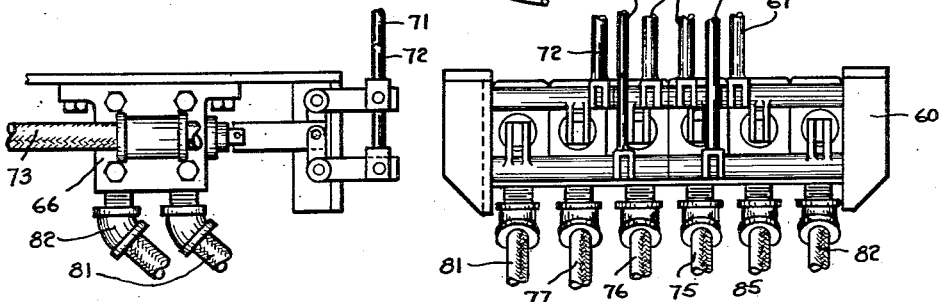

July 30, 1957

J. S. PILCH 2,801,013

HYDRAULIC TRENCHER

Filed May 6, 1955

INVENTOR.
JOHN S. PILCH
BY
Raymond A. Paquin
ATTORNEY.

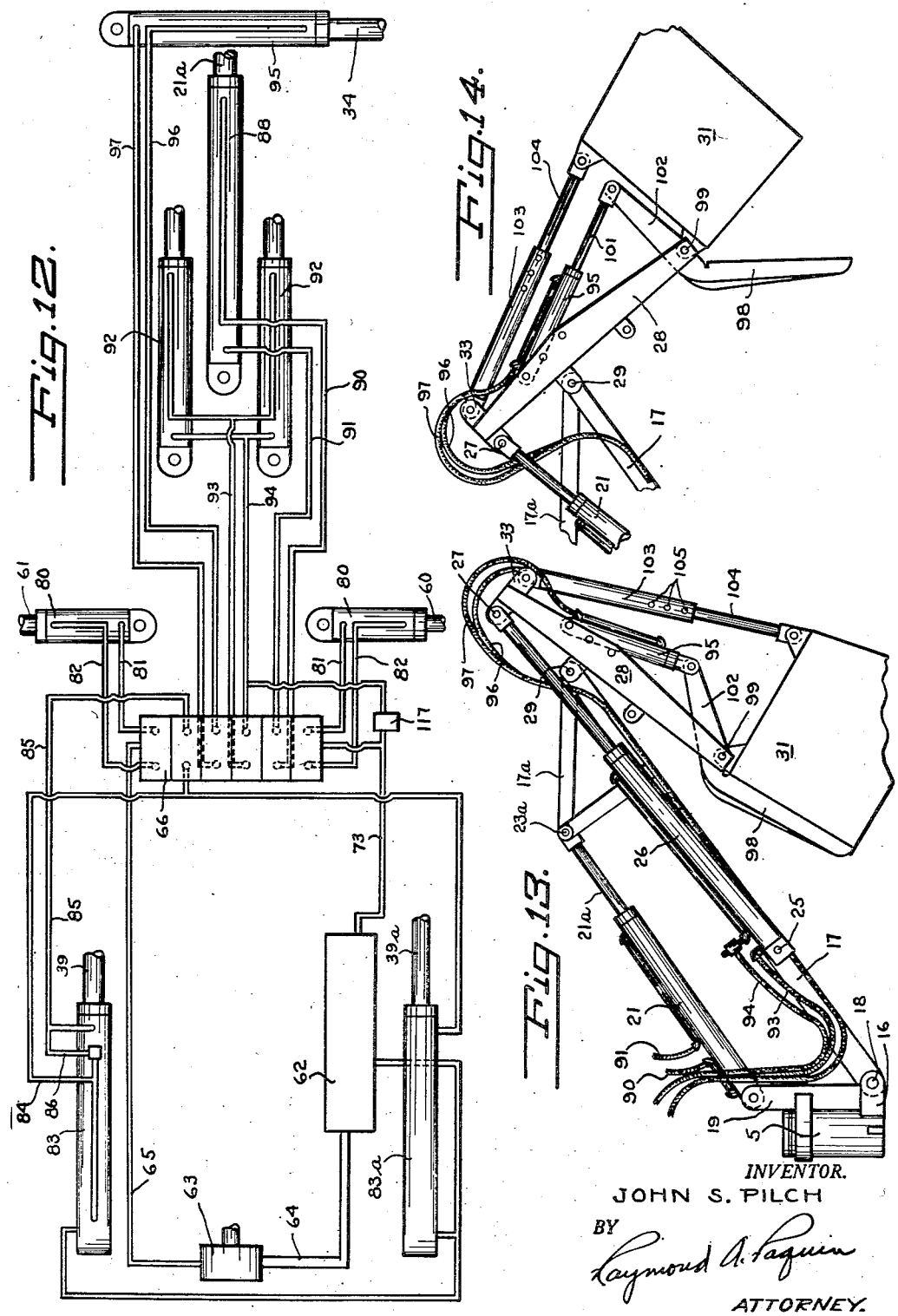

July 30, 1957  J. S. PILCH  2,801,013
HYDRAULIC TRENCHER
Filed May 6, 1955  6 Sheets-Sheet 6
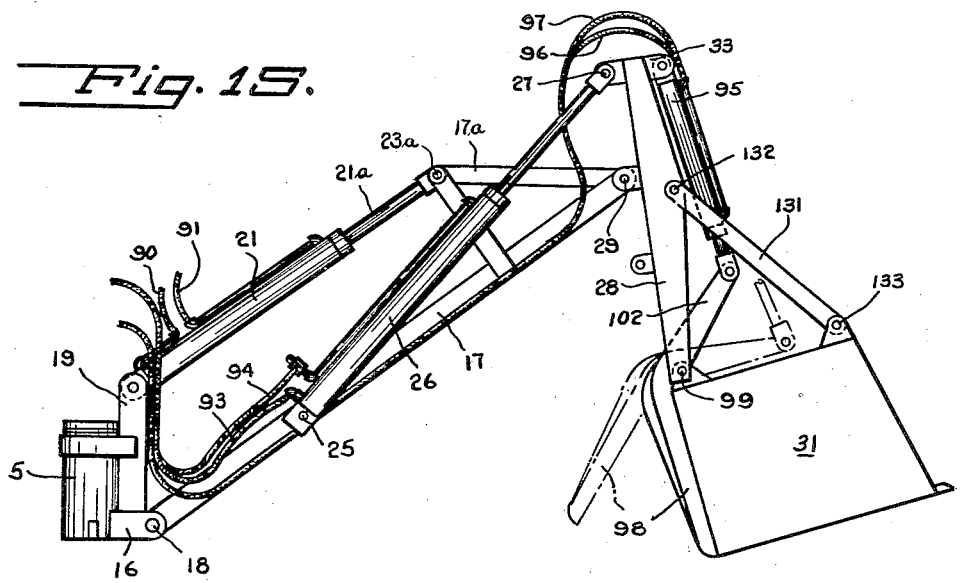
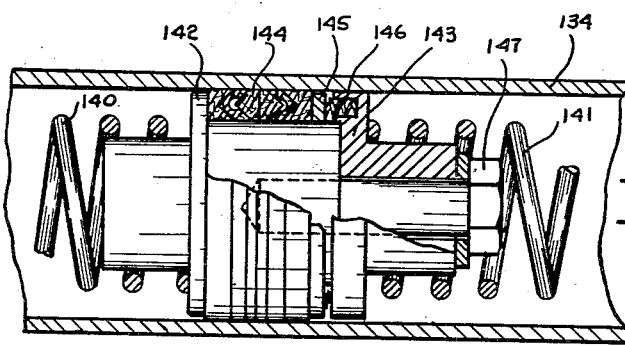
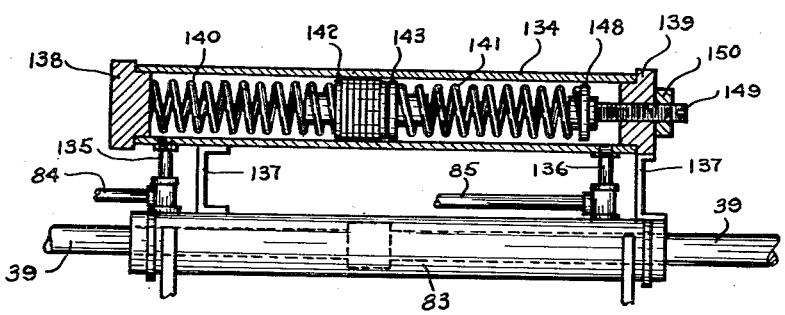
INVENTOR.
JOHN S. PILCH
BY
ATTORNEY.

United States Patent Office 2,801,013
Patented July 30, 1957

2,801,013

HYDRAULIC TRENCHER

John S. Pilch, Ware, Mass.

Application May 6, 1955, Serial No. 506,620

2 Claims. (Cl. 214—138)

This invention relates to a backhoe, or the like, and has particular reference to an all hydraulic apparatus adapted for use with a tractor and which takes its power from the tractor engine.

This application is a continuation in part of my application Serial Number 127,170, filed November 14, 1949, and now abandoned.

An object of the invention is to provide a new and improved device of the type set forth that is entirely hydraulically operated, which will work quickly and fast and yet give smooth, simple operation and which does not require an experienced operator.

Another object of the invention is to provide a new and improved device of the type set forth which is carried by a tractor or vehicle and which is capable of operation over a wide operating angle or range without movement of the vehicle or tractor and wherein the operator has complete control of the boom and dipper stick in all directions.

Another object is to provide a hydraulic system for the backhoe with flow control valve means which allows a quick drop of the boom when needed.

Another object is to provide a hydraulic backhoe which has hydraulic swing with an adjustable cushion start and stop, thereby assuring an exceptionally fast, yet smooth, swing.

Another object is to provide such a device wherein the hydraulic controls give down pressure on the boom to force the bucket into the ground for a fast, full load.

Another object of the invention is to provide a device of the type set forth which is completely hydraulically actuated and which is relatively easy and simple to operate and which seldom requires engine speed to go beyond idling, thus assuring longer engine life and reducing maintenance and fuel consumption.

Another object of the invention is to provide such a device which is relatively compact and neat and which has a greater range of operation without danger of damage to the apparatus caused by stones or other obstructions and which can work in areas where truck or crawler mounted units cannot work.

Another object of the invention is to provide a device of the type set forth wherein the operating cylinders are all above the boom thereby substantially eliminating the possibility of damage thereto during operation of the device.

Another object of the invention is to provide a device of the type set forth wherein wear and tear on the engine is reduced by a safety feature in the hydraulic system which eliminates the possibility of the motor stalling from overloading.

Another object is to provide a new and improved valve construction for speeding up the operation of the hydraulic system of the device by eliminating vacuum delayed action of the system waiting for oil which is usually the cause of heating and system failure.

Another object of the invention is to provide such a device wherein the operating controls are positioned within an upright stationary cylinder about which is pivoted a boom supporting spool or cylinder, thereby providing a neater and more compact unit.

Another object is to provide a device of the character described wherein the boom actuating cylinder is provided with a spring loaded hydraulic shock absorber which operates in either direction and absorbs the shock of the swing.

Other objects and advantages of the invention will be apparent from the following description taken in connection with the accompanying drawings. It will be understood that changes may be made in the details of construction and arrangement of parts without departing from the scope of the invention as the preferred form has been given by way of illustration only.

Referring to the drawings:

Fig. 4 is a fragmentary sectional view taken on line 4—4 of Fig. 2, looking in the direction of the arrows;

Fig. 5 is a sectional view taken on line 5—5 of Fig. 4, looking in the direction of the arrows;

Fig. 6 is a fragmentary view generally similar to Fig. 4, but on an enlarged scale, showing the control mechanism;

Fig. 7 is a fragmentary rear view of the control mechanism;

Fig. 12 is a schematic view of the hydraulic system;

Fig. 13 is a side view of a modified type of bucket which is hydraulically opened and closed;

Fig. 14 is a side view showing the bucket of Fig. 13 in open position;

Fig. 15 is a view similar to Figs. 13 and 14 but showing a modified bucket arrangement wherein the bucket rotating cylinder shown in Fig. 1 is employed to control the opening and closing of the bucket door;

Fig. 16 is a side view, partially in section, of a modified form of the boom operating cylinder shown in Fig. 3 in which a spring loaded hydraulic shock absorber is employed; and Fig. 17 is a fragmentary sectional view, on an enlarged scale, of the spring loaded hydraulic shock absorber shown in Fig. 16.

Figure 1:
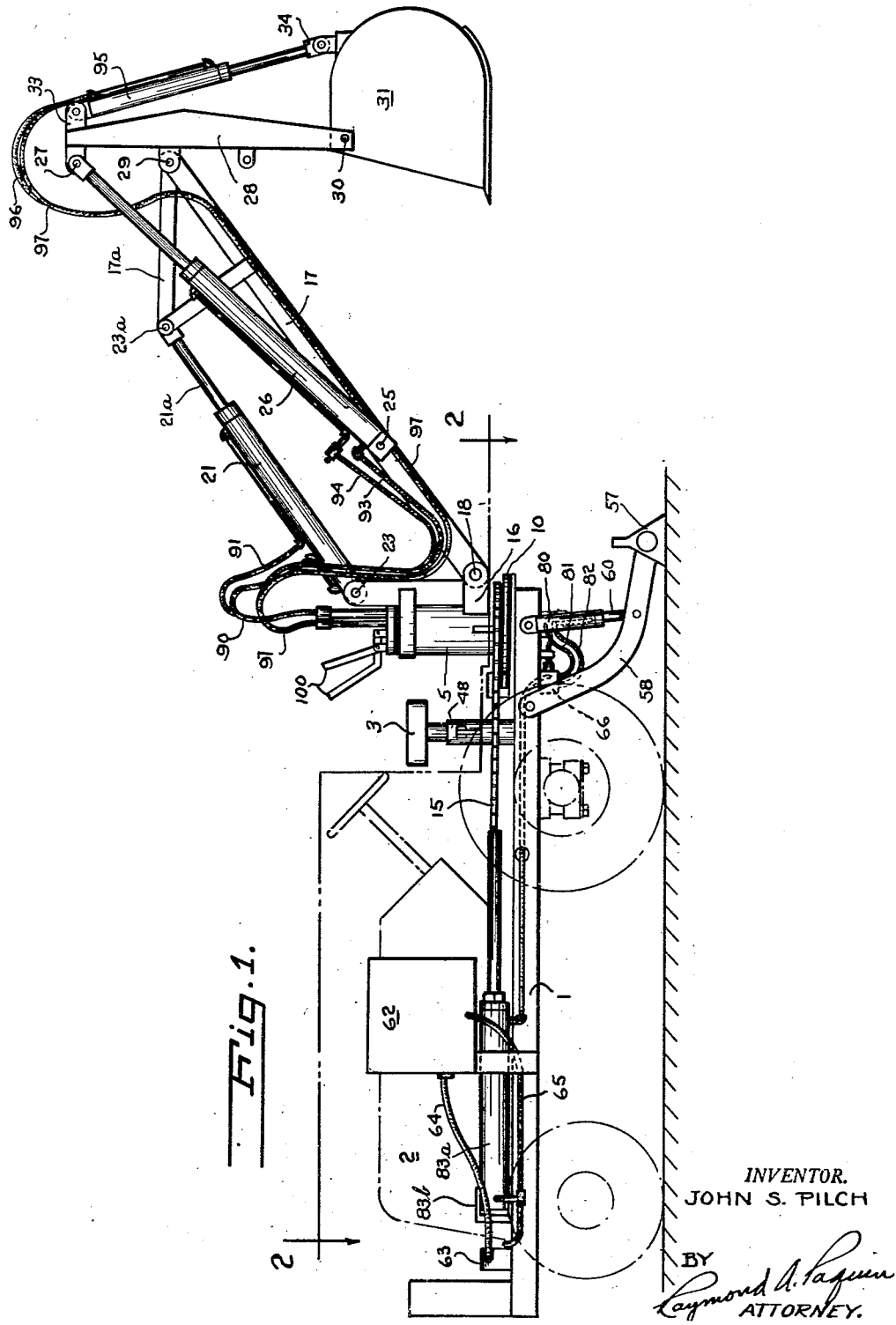
Fig. 1 is a side view of the device in position on a tractor.
Figure 2:
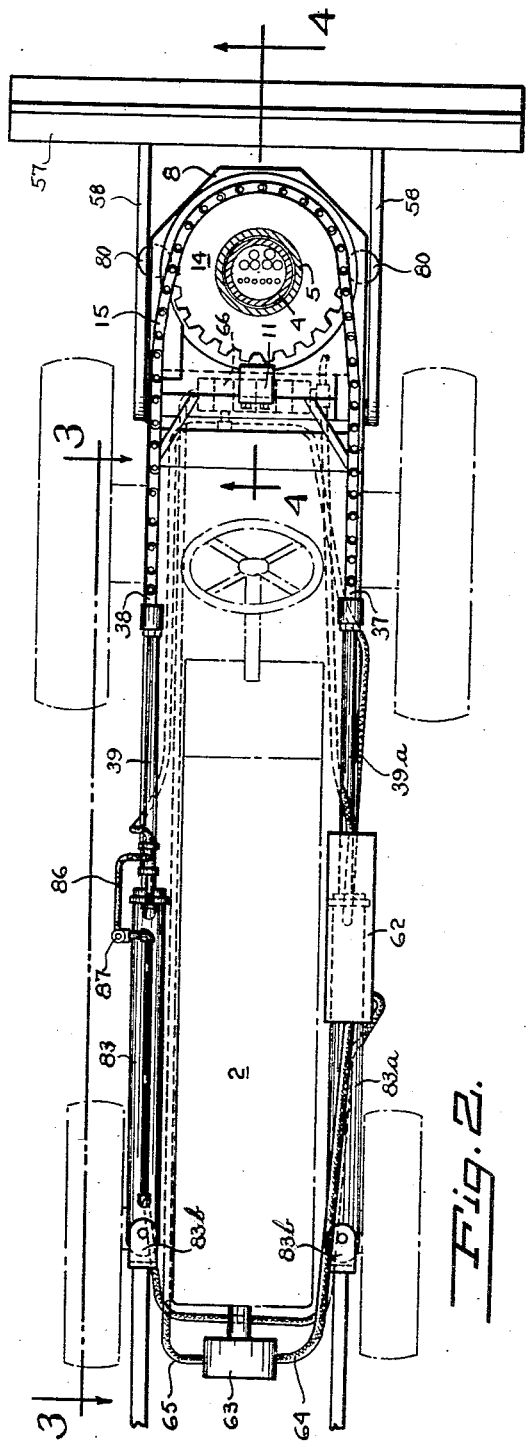
Fig. 2 is a sectional view taken on line 2—2 of Fig. 1, looking in the direction of the arrows.
Figure 3:
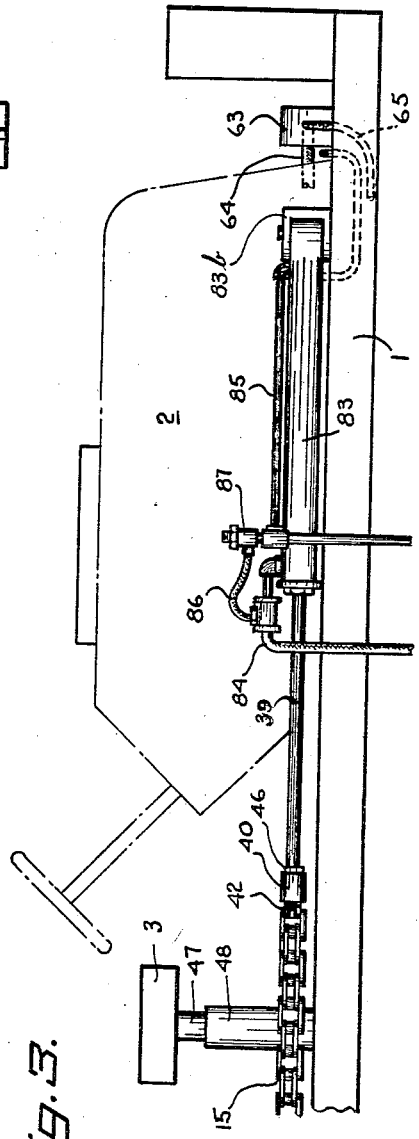
Fig. 3 is a fragmentary side view taken on line 3—3, looking in the direction of the arrows, of the side opposite that shown in Fig. 1, and on an enlarged scale.

Referring more particularly to the drawings wherein similar reference characters designate corresponding parts throughout, the device is shown embodied in a tractor comprising a frame 1 supporting the engine 2 and provided with the seat 3 for the operator.

Behind the seat 3, that is, on the side thereof opposite the engine 2 is positioned the stationary upright cylinder 4 surrounding which is positioned the spool or pivotable cylinder 5 and between the two cylinders 4 and 5 are positioned the bronze bearing sleeves 6 and 7 which are secured to stationary cylinder 4 and form a bearing for pivotable cylinder 5.

The frame 1 and cross bar 1a carry the support 8 which is secured thereto and which has an opening adapted to receive the stationary cylinder 4 which is secured to said support 8 surrounding said opening. On the support 8 is positioned the bronze bearing segments or ring 9 on which is slidably mounted the base member 10 which has an opening aligned with the opening in support 8 and said base member 10 carries the pivotable cylinder 5 which is secured thereto and adapted to pivot therewith. The pad 11 is provided for retaining base member 10 in position and said base member may be adjusted upon adjustment of said pad, and bearing member 12 is positioned between pad 11 which is secured to cross bar 1a by bolts 13 or other suitable means and said bearing 12 allows sliding motion of base member 10 relative to pad 11. It is preferable that the securing means 13 be in the form of bolts or other removable form of device because it is necessary to remove pad 11 to place base 10 and cylinder 5 in operative position or to remove it therefrom and also to allow adjustment of the pressure of pad 11 on base 10.

Base member 10 is provided with the toothed ring or segment 14 adapted to engage chain 15 for pivotal movement of base 10 and cylinder 5 as hereinafter described.

On the base member 10 and cylinder 5 is secured the support 16 to which is pivotally connected the boom 17 by pivot pin 18. Also secured to cylinder 5 are a pair of supports 19 and 20 to the upper ends of which are pivotally connected the end of the boom operating cylinder designated 21 in Figs. 1 and 4 and as 88 in Fig. 12 at 23 and this cylinder has its opposite end pivotally connected to boom 17 at 23a. Ram 21a is connected to struts 17a carried by boom 17 which allows greater vertical pivoting of the boom without interference.

The boom 17 is provided with pivot 25 for the dipper stick cylinders 26 which are pivotally connected at one end to said pivot 25 and at their opposite end 27 to dipper stick or lever 28 which is pivotally connected intermediate its ends at 29 to the adjacent end of boom 17 and said lever 28 is pivotally connected at its free end 30 to bucket 31. The cylinder 95 is provided for operating the bucket 31 as hereinafter described and it is pivotally connected at its end 32 to the adjacent end 33 of lever 28 adjacent the connection of the end 27 of cylinder 26 to dipper stick 28, and cylinder 95 is pivotally connected adjacent its opposite end 34 to bucket 31.

Figure 9:
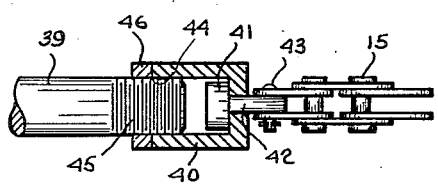
Fig. 9 is a sectional view of the arrangement for taking up any slack in chain construction.

The flexible driving member or chain 15 has its opposite ends connected to rams 39 and 39a in cylinders 83 and 83a respectively for pivoting the turret in opposite directions for pivoting the boom 17. Cylinders 83 and 83a are each pivotally connected at 83b to the frame. In order to take up any slack in said chain 15, there are provided adjustable connections between chain 15 and the ends 37 and 38 of rams 39 and 39a, one of which is shown in Fig. 9. These connections may be employed at only one end of the chain or both ends thereof as desired and comprise a hollow coupling member 40 adapted to receive beaded member 41 which has a reduced extension 42 extending through an opening in coupling member 40 and secured to chain 15 by a bolt, rivet, or other suitable member 43. The hollow coupling member has a threaded portion 44 adapted to receive and engage the threaded end 45 of the end of ram 39 and the members are locked in adjusted position by lock nut 46.

Figure 8:
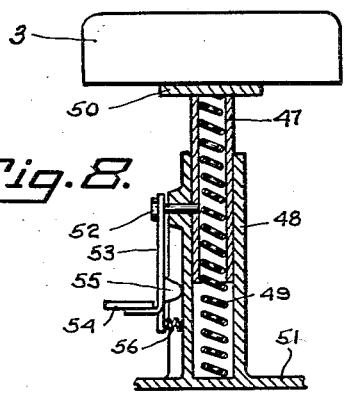
Fig. 8 is a sectional view of the supporting structure for the operator's seat.

The seat 3 is spring loaded and swivels and is supported by the telescoping tubular members 47 and 48 within which is positioned the coil spring 49 which has its opposite ends engaging the bases 50 and 51 of the tubular members 47 and 48 respectively. Tubular member 48 is provided with pin 52 which is carried by lever 53 and adapted to extend through aligned openings in tubular members 47 and 48 to lock the tubular members in desired adjusted relation and by stepping on pedal portion 54, lever 53 is pivoted around pivot center 55 against the force of spring 56, which normally retains lever 53 in the position shown in Fig. 8 and thereby retains pin 52 in position in the aligned openings in tubular members 47 and 48, pin 52 will be retracted from said aligned openings thereby allowing the adjustment of seat 3 and tubular member 47 which is carried thereby to be adjusted to desired height and then upon release of said pedal 54 the pin 52 is returned into the aligned openings to lock the tubular members 47 and 48 in operative relation.

It will be noted that the operator will occupy the same seat during operation of the tractor and the hydraulic trencher and that by turning the seat one hundred and eighty degrees and raising or lowering the seat while stepping on pedal 54, the seat may be adjusted according to the position desired depending on whether the operator is to operate the tractor or trencher.

To prevent tipping or movement of the tractor during use of the device, there is provided a stabilizer 57 carried by pivoted arms 58, which are pivotally connected to the frame 1. This stabilizer 57 is adapted to be raised and lowered by hydraulically operated rams 60 and 61 in cylinders 80. This stabilizer 57 can also be used for filling operations as a dozer blade.

The hydraulic system embodies the usual tank 62 and pump 63. Tank 62 is connected by pipe line 64 with pump 63 and pump 63 is connected by pipe line 65 with control valve 66. The operating rods or levers 67, 68, 69, 70, 71 and 72 extend upwardly from control valve 66, through cylinder 4 and each are provided with an operating handle 100 at their upper end as shown for operation of the controls. Return or overflow line 73 extends between control valve 66 and tank 62.

The hydraulic lines or pipe lines 74, 75, 76, 77, 78 and 79 extend from control valve 66 upwardly through cylinder 4 to their respective cylinders as hereinafter described.

The two cylinders 80 for operating the rams 60 and 61 for the stabilizers or legs are each connected by branches of hydraulic lines 81 and 82 adjacent their opposite end to control valve 66. Within each of the cylinders 80 are pistons connected to rams 60 and 61 and adapted to actuate the same upon application of pressure through the lines 81 and 82.

Control valve 66 is connected to cylinder 83 by hydraulic lines 84 and 85. Connecting lines 84 and 85 is a line 86 in which is interposed valve 87 as hereinafter described.

Cylinder 83 and ram 39 to which a double acting piston is connected are adapted to be actuated by fluid through either lines 84 or 85 to thereby actuate the piston in cylinder 83 and which is connected to ram 39 in desired direction. As ram 39 is connected to chain 15, the chain is thereby adjusted in desired direction to the extent desired and through chain 15, base 10, the toothed portion 14 of which engages chain 15, and boom 17 are rotated to desired angular position. Because of the features of the construction such angular adjustment may be effected throughout a relatively wide angle, for example, I have found it possible to get such adjustment throughout approximately two hundred degrees. Also because of the use of a single piston for obtaining such adjustment in either direction, I have substantially eliminated the possibility of slack developing in the chain and any minor slack that may be present can be eliminated by the adjustable connections between the ends of ram 39 and chain 15 as previously described.

Also because the control levers and hydraulic pipe lines for the twin boom cylinders, dipper stick cylinder and bucket operating cylinder all extend through the cylindrical sleeve 4, they are protected from damage or injury during rotation or use of the device and a neater, more compact unit is provided which does not interfere with the operation or cause obstructions which might interfere with the action of the device.

Control valve 66 is connected to the opposite ends of twin boom operating cylinders 88 and 89 by means of branches of hydraulic lines 90 and 91 which are connected to lines 79 and 77 respectively. Dipper stick cylinder 92 is connected at its opposite ends to control valve 66 by means of lines 93 and 94 which are connected to lines 76 and 75 respectively and bucket rotating cylinder 95 is connected by means of pipe lines 96 and 97 through lines 78 and 74 respectively to said control valve 66.

In the modification shown in Figs. 13 and 14, the bucket 31 is of the type employing a pivoted door 98 which is pivoted to the bucket 31 at 99. The door is shown in closed position in Fig. 13 and in open position in Fig. 14 and is adapted to be opened and closed by the hydraulic cylinder 95 which is connected to dipper stick 28 and which has the ram 101 which is connected to the extension 102 on door 98. In this form the bucket 31 is held in fixed relation with the dipper stick 28 by means of cylindrical member 103 which receives ram 104 and said ram is secured in adjusted position relative to cylinder 103 by a pin in any one of the openings 105 which pin extends through any of said openings 105 and an aligned opening in ram 104. The two types of buckets shown are interchangeable.

In the hydraulic lines 85 and 86 is interposed the hydraulic bypass valve 87, which valve connects said lines 85 and 86 and contains the bore 106 adapted to be closed by threaded cap 107 having a bore 108. In bore 108 is positioned spring seat 109 which is adapted to engage adjustment set screw 110. Bore 106 has a lapped surface and is adapted to receive piston 111 which also has a lapped surface adapted to fit in close relation with the lapped surface of bore 106. Piston 111 has a circumferential groove 112 adapted to receive O-ring 113 for further sealing of the adjoining surfaces of the piston and bore 106.

Duct 114 connects bore 106 with line 85 and duct 115 connects bore 106 with line 86. Coil spring 116 engages piston 111 and spring seat 109 and urges piston 111 into the position shown in Fig. 11 to normally close ducts 114 and 115. Pressure of fluid from either line 85 or 86 forces piston 111 off its seat allowing the direct passage of oil while such pressure is exerted without loss of time due to such oil passing through control valve 66.

This valve 87 is intended to bypass fluid directly from line 85 to line 86 and vice versa whereby delayed action waiting for oil by either of the lines, depending upon which line is under pressure, is eliminated thereby eliminating heating and system failures due to vacuum and also eliminating any fluttering of the boom due to such vacuum or delayed action.

Figure 10:
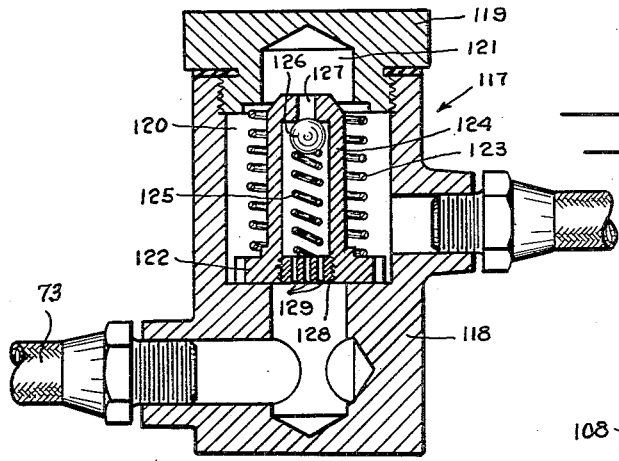
Fig. 10 is a sectional view of one of the hydraulic valves.
Figure 11:
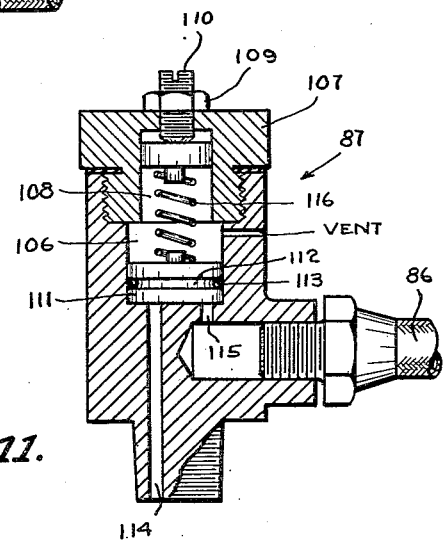
Fig. 11 is a sectional view of another of the hydraulic valves.

In Fig. 10 there is shown a valve 117 generally similar to valve 87 shown in Fig. 11. This valve is interposed between hydraulic lines 73 from the tank 62 and line 94 and comprises valve body 118 and threaded cap 119 having aligned bores 120 and 121 respectively. Within bore 120 is check valve member 122 which is normally retained on its seat by coil spring 123 which surrounds hollow reduced extension 124 on check valve member 122. Within the hollow extension 124 is coil spring 125 which normally retains ball check valve 126 in position to close passages 127 as shown and the hollow extension is closed by threaded plug 128 having the apertures 129 therethrough.

I have found that valve 117 will operate satisfactorily if ball check valve 126 and spring 125 are eliminated and the passage through hollow extension 124 and/or passage 127 are made small.

This valve 117 is interposed in the line from the tank to the twin cylinders on the boom and functions when the control for the hydraulic system for operating the twin boom cylinder 88 and 89 is adjusted to effect lowering of the boom 17. This lowering takes place quickly due to the weight of the boom, bucket and load and would create a vacuum behind the pistons in the twin cylinders 88 and 89. This vacuum is prevented by valve 117 which allows oil to be drawn directly from tank 62 through line 73. At all other times fluid for this line comes through control valve 66.

It is pointed out that when digging with the dipper stick, the boom automatically travels up. If the size of port 127 or the pressure on ball check 126 is correct, the bucket will slide over hard objects after the predetermined pressure has been reached. This functions as an automatic boom lift and eliminates the tendency of the tractor to raise up and attempt to tip over. I have found that with the valve 117 as previously described, that the tractor remains on the ground and that the boom automatically raises when the bucket has too large a bite or hits too hard an object.

In Fig. 15 there is shown an optional bucket arrangement wherein the bucket 31 is carried by the dipper stick 28 and in which the double acting cylinder 95, which is normally employed for rotating the bucket 31, is connected to extension 102 on door 98 which construction provides a hydraulic control for door 98 to open and close door 98 and, therefore, provides controlled discharge from bucket 31 by hydraulically opening or closing door 98 as little or as much as wanted. In this construction the dipper stick is provided with brace 130 and a pair of links 131, only one of which is shown, is provided which is connected to dipper stick 28 at 132 and to bucket 31 at 133.

In Figs. 16 and 17 is shown the double acting spring loaded hydraulic shock absorber which acts in either direction and absorbs the shock of swing of the boom, thereby providing an adjustable cushion start and stop for the boom swing and thereby allowing an exceptionally fast, yet smooth, swing.

This shock absorber construction comprises a cylinder 134 which is connected adjacent its opposite ends by pipe lines 135 and 136 to lines 84 and 85 respectively. Cylinder 134 may be supported relative to double acting cylinder 83 by supports 137.

The ends of cylinder 134 are closed by members 138 and 139. Within cylinder 134 are coil springs 140 and 141. Spring 140 engages member 138 at one end and its opposite end engages member 142 of a composite piston member which is composed of members 142 and 143 between which is positioned packing 144 which is engaged by ring 145 which is held in engagement by springs 146 which extend into seats in member 143.

Members 142 and 143 are retained in aligned operative relation by means of bolt 147.

Coil spring 141 engages member 143 at one end and has its opposite end engaging spring seat 148 which is adjustable through adjustment of screw 149 which is threaded through an opening in member 139 and adapted to be locked in adjusted position by lock nut 150.

The operation is believed clear from the description given hereinabove in that cylinder 83 and the double acting piston connected to rams 39 are adapted to actuate chain 15 and thereby pivot or rotate spool or cylinder 5 and boom 17 to desired angular position.

The boom is then raised or lowered, as desired, through the twin boom operating cylinders 88 and 89 and dipper stick 28 is pivoted by means of cylinder 26. The bucket 31 is rotated about its connection with the dipper stick by cylinder 95 whereby the bucket may be employed as a pry bar under rocks or other heavy objects.

The device is entirely hydraulically operated and may be easily and quickly operated by movement of handles 100 to actuate the control rods and thereby actuate control valve 66.

The form of bucket shown in Figs. 13 and 14 is dumped by cylinder 95 through ram 101 which opens pivoted door 98.

The material in the optional form of bucket shown in Fig. 15 is discharged at a controlled rate by means of hydraulically operated door 98 which is actuated, that is, opened or closed by hydraulic cylinder 95 which cylinder is the one employed in the construction shown in Fig. 1 for rotating bucket 31.

From the foregoing it will be seen that I have provided simple, efficient and economical means for obtaining all of the objects and advantages of the invention.

I claim:

1. In a tractor a frame, an engine mounted on said frame, a stationary upright cylinder on said frame, a bank of hydraulic valves mounted on said frame, a rotatable cylinder mounted on said stationary upright cylinder, a base member secured to and rotatable with said rotatable cylinder, means mounted on said frame to rotate said base member, a first support mounted on said rotatable cylinder, adjacent said base, a boom mounted on said support, a second support mounted on said rotatable cylinder above said first support, boom operating hydraulic piston and cylinder means mounted on said second support and secured to said boom, hydraulic connecting means between said boom operating hydraulic cylinder means and said bank of valves, said hydraulic connecting means being connected to one of the valves in said bank of valves, said hydraulic connecting means comprising two hydraulic conduits connected to the bank of valves, one conduit for raising the boom, the other for lowering the boom, said bank of valves being so constructed and arranged that when hydraulic pressure is admitted to one of said hydraulic conduits the other conduit is connected to a return line, the conduit leading to the hydraulic piston and cylinder means to lower the boom being provided with a branch line connected to a supply of hydraulic fluid that is not under pressure, and a valve in said branch line so constructed and arranged that hydraulic fluid will be drawn through said branch line into said conduit when said boom is lowered at a rate of speed that develops a partial vacuum in said conduit, and control means for said bank of valves.

2. The device of claim 1 in which said valve in said branch line is provided with pressure relief means whereby when operating the boom as a support for a digging bucket the boom may be raised by the thrust of the bucket against hard objects encountered in digging so that the end of the tractor will not be lifted from the ground.

References Cited in the file of this patent

UNITED STATES PATENTS

| | | |
|---|---|---|
| D. 162,873 | Pilch | Apr. 10, 1951 |
| 2,246,348 | Coffee | June 17, 1941 |
| 2,541,045 | Ferwerda et al. | Feb. 13, 1951 |
| 2,614,388 | Miller | Oct. 21, 1952 |
| 2,628,731 | Reuter | Feb. 17, 1953 |
| 2,672,995 | Drott | Mar. 23, 1954 |

OTHER REFERENCES

Advertising Circular of the Wain-Roy Corp., pub. March 1949.

Advertising Circular of Sherman Products Inc., form SP-547, pub. early summer 1949.